United States Patent
Le Fur et al.

(10) Patent No.: US 12,359,067 B2
(45) Date of Patent: Jul. 15, 2025

(54) PROCESS FOR THE MANUFACTURE OF A LIGNOCELLULOSIC FIBRE-BASED COMPOSITE MATERIAL AND COMPOSITE MATERIAL OBTAINED BY SUCH PROCESS

(71) Applicant: Evertree, Venette (FR)

(72) Inventors: Xavier Le Fur, Jaux (FR); Carine Mangeon Pastori, Saint Maur des Fosses (FR)

(73) Assignee: Evertree, Venette (FR)

( * ) Notice: Subject to any disclaimer, the term of this patent is extended or adjusted under 35 U.S.C. 154(b) by 636 days.

(21) Appl. No.: 17/754,715

(22) PCT Filed: Oct. 9, 2020

(86) PCT No.: PCT/EP2020/078461
§ 371 (c)(1),
(2) Date: Apr. 8, 2022

(87) PCT Pub. No.: WO2021/069689
PCT Pub. Date: Apr. 15, 2021

(65) Prior Publication Data
US 2023/0135128 A1    May 4, 2023

(30) Foreign Application Priority Data
Oct. 11, 2019   (EP) .................... 19306333

(51) Int. Cl.
C08L 97/02   (2006.01)
C08L 99/00   (2006.01)

(52) U.S. Cl.
CPC .............. C08L 97/02 (2013.01); C08L 99/00 (2013.01); *C08L 2205/03* (2013.01)

(58) Field of Classification Search
CPC ...... C08L 97/02; C08L 99/00; C08L 2205/03; C08L 101/00; C08J 5/047; C08J 5/045
See application file for complete search history.

(56) References Cited

U.S. PATENT DOCUMENTS

| | | | |
|---|---|---|---|
| 2003/0041965 A1 | 3/2003 | Markessini et al. | |
| 2013/0065012 A1* | 3/2013 | Parker | C09J 189/00 106/155.21 |
| 2017/0266930 A1 | 9/2017 | Via et al. | |
| 2018/0319135 A1* | 11/2018 | Barzegari | C08L 1/10 |

FOREIGN PATENT DOCUMENTS

| | | | |
|---|---|---|---|
| CN | 102794809 A | * | 11/2012 |
| CN | 109291167 A | | 2/2019 |
| EP | 0976790 A1 | | 2/2000 |
| JP | 53012899 A | * | 2/1978 |
| JP | 2002052414 A | | 2/2002 |
| WO | 97/38833 A1 | | 10/1997 |
| WO | 2014184273 A1 | | 11/2014 |

OTHER PUBLICATIONS

CN 102794809 English Abstract (Year: 2012).*
JP 53012899 English Abstract (Year: 1978).*
Zeleniuc et al, "Peer-Reviewed Article Influence of Adhesive Type and Content on the Properties of Particleboard Made from Sunflower Husks", Jan. 1, 2019, p. 7316-7331, Retrieved from the Internet: URL: https://bioresources.cnr.ncsu.edu/wp-content/uploads/2019/07/BioRes_14_3_7316_Zeleniuc_BCF_Infl_Adhesive-Type_Content_Props_Particleboard_Sunflower_Husks_15626.pdf.
Hse et al, "Modified Formaldehyde-based Resin Adhesives for Rice Hull-Wood Particleboard", Jan. 1, 2002, Retrieved from the Internet: URL:https://pdfs.semanticscholar.org/689f/6f7cbbb0acfba7222ec4980631793d079b00.pdf?_ga=2.211903636.1207178616.1584007954-477767880.1565673130 [retrieved on Mar. 12, 2020].
Fonseca et al, "Jute fibers and micro/nanofibrils as reinforcement in extruded fiber-cement composites", Construction and Building Materials, vol. 211, Jan. 1, 2019, p. 517-527.
International Search Report and Written Opinion for PCT Application No. PCT/EP2020/078461, mailed on Jan. 28, 2021, 9 pages.

* cited by examiner

*Primary Examiner* — Katarzyna I Kolb
(74) *Attorney, Agent, or Firm* — ArentFox Schiff LLP

(57) ABSTRACT

The present invention relates to a process for the manufacture of a lignocellulosic fibre-based composite material comprising the steps of:
- obtaining a fibrous mix (S1) comprising a defibrated lignocellulosic material and defibrated plant seeds;
- blending the fibrous mix with a resin (S2) to form a composite mixture; and
- curing (S3) the composite mixture, thereby forming the lignocellulosic fibre-based composite material.

A preferred application of this process is the manufacture of fibreboards, such as MDF.

19 Claims, 3 Drawing Sheets

PROCESS FOR THE MANUFACTURE OF A LIGNOCELLULOSIC FIBRE-BASED COMPOSITE MATERIAL AND COMPOSITE MATERIAL OBTAINED BY SUCH PROCESS

CROSS-REFERENCE TO RELATED APPLICATIONS

This application is a National Phase of PCT/EP2020/078461, filed on Oct. 9, 2020, which claims priority to EP Application Serial No. 19306333.6, filed on Oct. 11, 2019, the disclosures of which are hereby incorporated by reference in their entireties.

FIELD OF THE INVENTION

The present invention relates to a process for the manufacture of a fibre-based composite material. The invention more particularly relates to a process for preparation of a fibre-based material comprising fibres bound by an adhesive comprising a protein source and a resin.

BACKGROUND OF THE INVENTION

In known manufacturing processes that utilize an adhesive that is or that comprises a resin, the adhesive portion will set from a liquid state to a solid state. The adhesive may set through loss of water into the air or into another portion of the composite, by a phase change, or by some chemical or physio-chemical change of the adhesive.

Adhesive compositions are used extensively in the wood products industry to make composites such as chipboard, fibreboard, and related composite wood products. Adhesive compositions are also used to make engineered lumber composites. Traditionally, these wood composites have been made using a urea formaldehyde (UF) resin or a phenol formaldehyde (PF) resin. More recently, polymeric methylenediphenyl diisocyanate (PMDI) has been used to make these composites. UF resin, PF resin and PMDI are made from petroleum feedstock and can require high temperature conditions to facilitate curing. For example, heating the resin-wood mixture to temperatures exceeding 100° C., and often 200° C., while exerting pressure on the mixture in order to form the composite.

Many adhesives in the composite industry, especially where biomaterials are used, are water-borne. In this situation, water serves as a primary component either to dissolve or disperse the adhesive components. For example, urea-formaldehyde (UF) adhesives are often provided in the form of a solution.

Manufacturing of fibreboards, such as medium-density fibreboards (MDF), is one of the main applications of the processes for manufacturing a fibre-based composite material. Medium-density fibreboard (MDF), and other types of fibreboards such as high density fibreboard (HDF), low density fibreboard (LDF) and ultra-low density fibreboard (ULDF) are generally obtained from a lignocellulosic material, in particular wood, according to a process that may be summed up as follows.

The first step in the fibreboard (e.g., MDF, HDF, LDF or ULDF) process is wood handling which typically includes debarking, log breaking into chips and chip/bark handling systems. In this step, wood chips are separated from stones and other contaminations. The next step is the fibre preparation, which may include processing the wood chips in a chip washer, a steaming bin, a preheater and a defibrating apparatus such as a refiner or defibrator. In the steaming bin, wood chips are heated by steam to a temperature around 80-95° C., and they are then conveyed by a plugscrew that squeezes water out of the chips before they enter the pre-heater. In the preheater the chips are heated to a temperature of around 160° C. which makes the fibres soft and easier to separate. The softened chips are then transported and introduced (usually through a screw) into the defibrator, where they are ground into fibres between two metal members (e.g., discs or plates) under a steam pressure up to 8 bar. The fibres flow with the steam out of the refiner into a so-called blow line where wood fibres are resinated, i.e. sprayed with a thermoset resin. The obtained fibres are dried with for example one or two dryer cyclones and a Z-Sifter. In the cyclones the fibres are dried with hot flue gas or steam to attain 5%-10% moisture content. The Z-Sifter cleans the fibres of contaminates before the forming stage. During the forming stage the resinated fibres are formed into a mat, which enters a cold pre-press before it goes into a hot press. The last stage is handling, where the fibreboards are cut to the desired dimensions, cooled down, and stacked before delivery.

Such a process and the industrial equipment that can be used to perform it are described for example in: *Wood-Based Panels—An Introduction for Specialists, COST Office*, 2010, Published by Brunel University Press, ISBN 978-1-902316 6, and by Halvarsson, S., *Manufacture of straw MDF and fibreboard, Thesis for the degree of Doctor of technology*, Sundsvall, 2010.

In certain known fibre-based materials, the wood fibres are replaced by other natural fibres, such as straw fibres (wheat, rice or corn fibre). For example, U.S. Pat. No. 5,663,221 discloses the use of sunflower husks to make MDF boards, as replacement of the wood fibre-based reinforcement. According to the process disclosed in this document, the raw material used undergoes steps similar to those used for making wood-based MDF. The process according to this document aims at decreasing the consumption of energy for the production of MDF boards, compared to the production of wood based boards.

WO00/06650 discloses composite materials obtained from vegetable materials containing fibres such as sunflower, rapeseed, and soybean, and a bonding agent. This document however relates to a thermoplastic process.

In some of the known processes for manufacturing a fibre-based composite, protein raw material such as soy is used. More particularly, protein sources, such as soy protein isolate or soy flour, are used in combination with the curing agent.

U.S. Pat. No. 630,699 discloses a soybean-based adhesive resin comprising soybean flour and a crosslinking agent, namely a PF resin, and a method of making this adhesive. This method involves providing an aqueous solution of soybean flour (dispersion of flour in an aqueous liquid, typically water) and adding a cross-linking agent to the solution under conditions effective to cross-link the soybean flour so that an adhesive resin is formed. This adhesive can be used for the manufacture of fibreboards. More generally, there is disclosed a composite product which includes particulate plant material and the soybean-based adhesive resin.

Similarly, WO2009/048598 discloses an adhesive for lignocellulosic composite comprising an aqueous mixture of protein, a polyamidoamine-epichlorohydrin (PAE) resin as crosslinker, and a non-urea diluent (a low volatility water-soluble compound that provides low viscosity in water).

Such processes that use an aqueous solution with a protein plant powder or flour dispersed in water with a resin are however water consuming and may lead to viscosity issues of the adhesive. They may also lead to process issues, in particular because an excessive amount of water may be brought on the fibres. This requires to perform additional drying to obtain the desired amount of water brought on the fibres before pressing. Such processes are also complex and not cost efficient, because the use of aqueous dispersion requires grinding the plant material and then mixing the plant powder with an aqueous liquid (such as water). Whether the dispersion is done directly on the production site of the composite material or purchased from a supplier, it is a costly product. When the dispersion is purchased, the shelf life of the dispersion must be managed, and may be a source of costs.

WO2016/141126 discloses a process for preparing lignocellulosic based composites, which are bonded with an adhesive comprising a protein source and a curing agent, namely a PAE resin. According to this process, a powdered or "dry" (e.g. flour) protein source is mixed with a lignocellulosic material after and separately from the mixing of the lignocellulosic material with a curing agent (resin).

Such a method is also not simple or cost-effective in that it requires the production or supply of a plant powder, and in the latter case the management of the shelf life of the powder. Furthermore, ensuring a good distribution of the powder in the composite material may be complex, in particular in that sedimentation of the powder may occur.

Invention Summary

The present invention aims at providing a process for the manufacture of a lignocellulosic fibre-based composite material which solves at least parts of the above mentioned problems.

The invention relates to a process for the manufacture of a lignocellulosic fibre-based composite material comprising the steps of:
  obtaining a fibrous mix comprising a defibrated lignocellulosic material and defibrated plant seeds;
  blending the fibrous mix with a resin to form a composite mixture; and
  curing the composite mixture, thereby forming the lignocellulosic fibre-based composite material.

In a process according to the invention, a fibrous mix mainly comprised of a defibrated lignocellulosic material and defibrated plant seeds is formed before being blended with a resin (i.e. "resinated"). The fibrous mix comprises at least 40%, preferably at least 60%, more preferably 80% w/w on dry matter of fibres. Defibrated plant seeds are seeds that are passed through a defibrator (such as by the Asplund or Mason method). The defibrated plant seeds may be a source of fibres (fibre-shaped particles) and/or non-fibre particles having properties (length, diameter or section, mechanical properties) which are different from those of the lignocellulosic material. But above all, the defibrated seed may be a protein source that enhances the adhesive and mechanical properties of the adhesive agent used in the formed composite material. Compared to the disclosure of the known prior art references, the process according to the invention greatly reduces the amount of water used. In particular, no water is used to form a plant flour (or meal) or protein dispersion.

Furthermore, the process of the invention addresses the viscosity issues that may occur in processes according the prior art that may be caused by the use of a plant flour (or meal) dispersion. No shelf life of such dispersion must be managed.

Advantageously, no protein in powder form is used (since defibrated seeds are used), which limits the risk of sedimentation of the protein source during the process and provides a better protein distribution in the composite material.

Composite materials having better mechanical performance, such as Flexural modulus of rupture (MOR) and modulus of elasticity (MOE), may be obtained, compared to composite material obtained by a process using a plant powder dispersion.

The step of obtaining a fibrous mix may comprise:
  providing a lignocellulosic material and providing plant seeds,
  mixing the lignocellulosic material and the plant seeds, thereby obtaining a mix of lignocellulosic material and plant seeds, and
  defibrating the mix of lignocellulosic material and plant seeds.

In such embodiment of a process according to the invention, refining the lignocellulosic material and plant seeds is performed in a single step, which may be performed directly on the composite material production site. This is cost-effective, compared to prior art processes that requires separate grinding or milling of plant material.

The step of defibrating the mix of lignocellulosic material and plant seeds may comprise a step of steaming the mix of lignocellulosic material and plant seeds before defibration by a thermo-mechanical process or a pressure release based process.

The step of defibrating the mix of lignocellulosic material and plant seeds may comprise:
  steaming the mix of lignocellulosic material and plant seeds in a steaming bin by steam to a temperature comprised between 70° C. and 150° C., and preferably between 80° C. and 95° C.,
  conveying to a pre-heater the steamed mix of lignocellulosic material and plant seeds and squeezing water out of the mix of lignocellulosic material and plant seeds before it enters the pre-heater,
  pre-heating the squeezed mix of lignocellulosic material and plant seeds in the pre-heater to a temperature depending on the lignocellulosic material and adapted to soften the lignocellulosic material fibres to ease their separation,
  processing the pre-heated mix of lignocellulosic material and plant seeds in a refiner, thereby obtaining the fibrous mix.

Alternatively, the step of defibrating the mix of lignocellulosic material and plant seeds may comprise:
  placing the mix of lignocellulosic material and plant seeds into a chamber;
  steaming the mix of lignocellulosic material and plant seeds;
  increasing the pressure inside the chamber to a high pressure; and
  releasing the mix of lignocellulosic through an orifice of the chamber to atmospheric pressure.

In the step of providing a lignocellulosic material, the lignocellulosic material may be in a discrete form, such as chips.

The fibrous mix may comprise a weight ratio of lignocellulosic material to plant seeds comprised between 40:60 and 99:1, and preferably between 80:20 and 95:5. The composite mixture may comprise:
  an amount of defibrated lignocellulosic material ranging from 40% to 99%, preferably from 50% to 95%, and more preferably from 80% to 90%, for example 84% in weight of the total dry matter of the composite mixture, and an amount of defibrated seeds ranging from 1% to 60%, preferably from 5% to 40%, and more preferably from 5% to 20% in weight of the total dry matter of the composite mixture.

The resin may represent from 0.1% to 20%, preferably from 0.3% to 5%, and more preferably from 0.5% to 3%, for example from 0.9% to 1.6% in weight of the total dry matter of the composite mixture.

The step of blending the fibrous mix with a resin may comprise resinating the fibrous mix in a blow line with the resin.

The step of curing the composite mixture may comprise the steps of:
  drying the resinated fibrous mix to a moisture content comprised between 0% and 20%, and preferably between 5% and 10%, forming (S32) the dried resinated fibrous mix into a mat,
  pressing the mat to obtain the lignocellulosic fibre-based composite material.

The invention also relates to a process for the manufacture of a fibreboard, comprising such a process, wherein it further comprises the steps of cooling and sawing the lignocellulosic fibre-based composite material, thereby forming fibreboards.

The invention also relates to a fibreboard obtained by such process.

The process may comprise a step of adding an amine compound to the resin or the fibrous mix, the amine compound being preferably one of urea, methylurea, polyurea, polyvinylamine, melamine, polyethylenimine (PEI), diethanoldiamine, ethanoldiamine, ethanolamine, diethanolamine, hexamine. The added amine compound represents from 0% to 25%, preferably from 0% to 10%, and more preferably from 2% to 10% in weight of the total dry matter of the composite mixture.

The process may comprise a step of adding an additive to the resin or the fibrous mix, the additive being at least one of: a wax, a metal salt, a vegetable oil, a fatty acid, a silicone, a pH modifier (acid or base), a polyol (e.g., glycerol), a tannin, a lignin, an amino acid (e.g., lysine), a metal oxide (e.g., MgO, ZnO, $TiO_2$, $Fe_2O_3$, $Al_2O_3$, $SiO_2$), starch, a fire retardant (e.g., ammonium (poly)phosphate, borate). The additives may represent from 0% to 20%, preferably from 0% to 10%, and more preferably from 0.1% to 3% in weight of the total dry matter of the composite mixture.

The process may also comprise a step of adding an additive (e.g., wax, dying agent (pigment), fire retardant) to the lignocellulosic material and/or plant seed, before the defibrating step.

The lignocellulosic material may be for example wood, corn stover, coconut husk, cotton stalk, flax, grass, hemp, kenaf, wheat straw, bagasse, oil palm trunks, bamboo, or a mix of two or more thereof. When the lignocellulosic material comprises wood, said wood may comprise at least one of pine wood, spruce wood, birch wood, and beech wood.

The plant seeds may be provided, before being defibrated, in the form of a seed meal, and preferably in the form of seed meal pellets. The plant seeds are advantageously oil and/or protein seeds, and preferably defatted oil and protein seeds.

The plant seeds may be seeds of plants belonging to one or several of the following families, genus and species:

Arecaceae such as:
  *Attalea*,
  *Elaeis*, and
  *Carthamus*, such as *Carthamus tinctorius*,
Asteraceae such as:
  *Helianthus*, such as *Helianthus annuus*,
Brassicaceae such as:
  *Brassica*, such as *Brassica napus*, *Brassica juncea*, *Brassica nigra*, *Brassica rapa*, *Brassica carinata*, and
  *Camelina* such as *Camelia Sativa*,
Cannabaceae such as:
  *Cannabis*, such as *Cannabis sativa*,
Fabaceae such as:
  *Glycine*, such as *Glycine max*
  *Lupinus*, and
  *Pisum*, such as *Pisum sativum*
Linaceae such as:
  *Linum* such as *Linum usitatissimum*,
Malvaceae such as:
  *Gossypium*,
and
Poaceae such as:
  *Avena*, such as *Avena sativa*,
  *Eleusine*, such as *Eleusine coracana*,
  *Hordeum*, such as *Hordeum vulgare*,
  *Oryza*, such as *Oryza sativa*, *Oryza glaberrima*,
  *Panicum*, such as *Panicum miliaceum*,
  *Sorghum*, such as *Sorghum* bicolor,
  *Triticum*, such as *Triticum aestivum*, *Triticum durum*,
  *Zea*, such as *Zea mays*.

The resin may be selected from:
a polyamidoamine-epichlorohydrin (PAE) resin, a polyalkylenepolyamine-epichlorohydrin resin, an itaconic acid-based polyamidoamine-epichlorohydrin resin and/or an amine polymer-epichlorohydrin resin,
an epoxy resin such as bisphenol A diglycidyl ether epoxy resin,
isocyanate resin, such as polymeric methylenediphenyl diisocyanate (pMDI)
urea-formaldehyde resin, melamine-formaldehyde resin, melamine-urea-formaldehyde resin, phenol-formaldehyde resin, resorcinol-formaldehyde resin, other resins based on formaldehyde or on another aldehyde such as furfural, propanal, butyraldehyde, succinaldehyde, glutaraldehyde, dimethoxyethanal, glyoxylic acid, glycolaldehyde, vanillin,
a polyurethane-based resin,
a polyacid-based resin such as based on maleic anhydride or acetic acid,
an acrylate-based or methacrylate-based resin such as poly(methyl methacrylate),
ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, ethylene vinyl alcohol (EVOH), polyvinylalcohol, polyvinylbutyral-co-vinylalcohol, polyvinylacetate-co-vinylalcohol.

A preferred resin is selected from a polyamidoamine-epichlorohydrin (PAE) resin, a polyalkylenepolyamine-epichlorohydrin resin, an itaconic acid-based polyamidoamine-epichlorohydrin resin and/or an amine polymer-epichlorohydrin resin, preferably a PAE resin.

The use of a non-formaldehyde resin (e.g. PAE resin) decreases or eliminates formaldehyde emission.

The invention also relates to a fibrous mix comprising lignocellulosic material fibres and defibrated plant seeds.

The invention also relates to a composite mixture comprising such a fibrous mix and a resin. The composite mixture may further comprise an amine compound and/or an additive being at least one of: a wax, a metal salt, a vegetable oil, a fatty acid, a silicone.

The invention also relates to a composite mat formed from such composite mixture.

The invention also relates to a lignocellulosic fibre-based composite material comprising a fibrous mix as above described and a resin, the fibrous mix forming a reinforcement and adhesive for said lignocellulosic fibre-based composite material and the resin, in a cured form, forming or being part of a matrix of said lignocellulosic fibre-based composite material.

The invention finally relates to a fibreboard panel made of a lignocellulosic fibre-based composite material as disclosed.

BRIEF DESCRIPTION OF THE SEVERAL VIEWS OF THE DRAWING

Other particularities and advantages of the invention will also emerge from the following description.

In the accompanying drawings, given by way of non-limiting examples.

DETAILED DESCRIPTION OF EMBODIMENTS OF THE INVENTION

Figure 1:
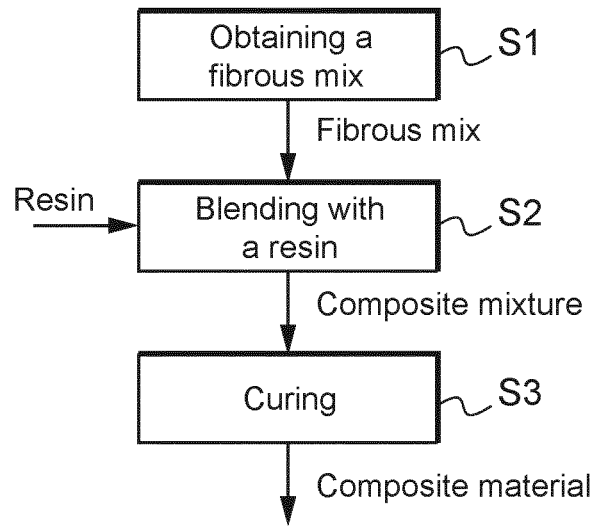
FIG. 1 is a schematic block diagram representing the main steps of a process according to the invention.

FIG. 1 represents the main steps of a process according to the invention. In a step of obtaining a fibrous mix (S1), a mix comprising a defibrated lignocellulosic material and defibrated plant seeds is obtained.

The term "resin" refers to an adhesive, a binder, a cross-linking agent or a curing agent in the form of a liquid or solid.

By lignocellulosic material, it is meant a material substantially comprising (or comprising a significant proportion of) lignocellulosic fibres. This comprises plants or plant parts. The lignocellulosic material may in particular be wood (e.g. pine wood, spruce wood, birch wood, or beech wood). Other types of lignocellulosic material can be used in the invention, as an alternative or complement to wood, such as corn stover, coconut husk, cotton stalk, flax, grass, hemp, kenaf, wheat straw, rice straw, bagasse, oil palm trunks, bamboo, or a mix thereof. The lignocellulosic material can be provided in a raw form, or a transformed form. Typically, wood may be provided in the form of chips.

The seeds used in the process are advantageously oil and/or protein seeds.

For example, the plant seeds are seeds of plants belonging to one or several of: palm, safflower (*Carthamus tinctorius*), sunflower (*Helianthus annuus*), rape, canola (*Brassica napus*), mustard (*Brassica juncea, Brassica nigra, Brassica rapa, Brassica carinata*), camelina (*Camelina sativa*), hemp (*Cannabis sativa*), soybean (*Glycine max*), lupine (*Lupinus*), pea (*Pisum sativum*), flax (*Linum usitatissimum*), cotton (*Gossypium*), cereals (e.g., maize (*Zea mays*), rice (*Oryza sativa*), wheat (*Triticum aestivum*), barley (*Hordeum vulgare*), sorghum (*Sorghum bicolor*), millet (*Panicum miliaceum*), oats (*Avena sativa*)), preferably sunflower.

The seeds (in particular oilseeds) may be defatted (i.e. deoiled) before they are processed. The seeds may in particular be provided in the form of a seed meal, and preferably in the form of seed meal pellets.

Seed meal pellets are prepared from seeds (optionally which is dehulled) which are ground and crushed, yielding a meal, which is pressed to extract some or most oil from the seeds, thus forming a press cake. Remaining oil (e.g. a press cake obtained from sunflower seeds contains 15-20% of oil) may be extracted partially or totally from the oilseed press cake. To extract the remaining oil, solvents can be used. For example, hydrophobic solvents such as pentane and/or hexane may be used. Water soluble solvent such as alcohol (e.g., ethanol) may also be used. When such organic solvents are used, the oil content remaining in the seed meal is low (e.g. ranging from 0.1 to 4 wt % by total weight of the pressed cake). Oilseed meals have a protein content ranging from 15% to 60% w/w, preferably from 20% to 50% w/w, more preferably from 30% to 50% w/w.

Plant seeds, which may be in a form of seed meal or seed meal pellet, having an oil content (determined by the Soxhlet method (ISO734:2016)) ranging from 0.1% to 4% w/w on dry matter and a protein content (measured according to French Standard NF EN Iso 16634 (2008)) ranging from 15% to 60% w/w on dry matter, preferably from 30% to 50% w/w on dry matter, more preferably from 30% to 50% w/w, are advantageous.

A preferred seed meal pellet is a rapeseed or sunflower seed meal pellet, more preferably sunflower seed meal pellet.

Information regarding oilseed processing technologies is described for example in Laisney, J., 1984, *L'huilerie moderne. Compagnie Française pour le Développement des Fibres Textiles (CFDT)*, ISBN 2-905157-00-3. Information regarding sunflower meals is described for example in: *Sunflower Seed Preparation and Oil Extraction*, Etienne Le Clef and Timothy Kemper, published in *Sunflower*, 2015, pages 187-226, AOCS Press., ISBN 978-1-893997-94-3.

The lignocellulosic material and the plant seeds are defibrated and mixed to form a fibrous mix. Defibration generally relates to the conversion of a material into fibrous constituents through a defibration process. In the case of plant seeds, defibration converts plant seeds into smaller size constituents such as fibrous constituents (fibre shaped particles) and/or non-fibrous constituents (non-fibre particles).

Figure 3:
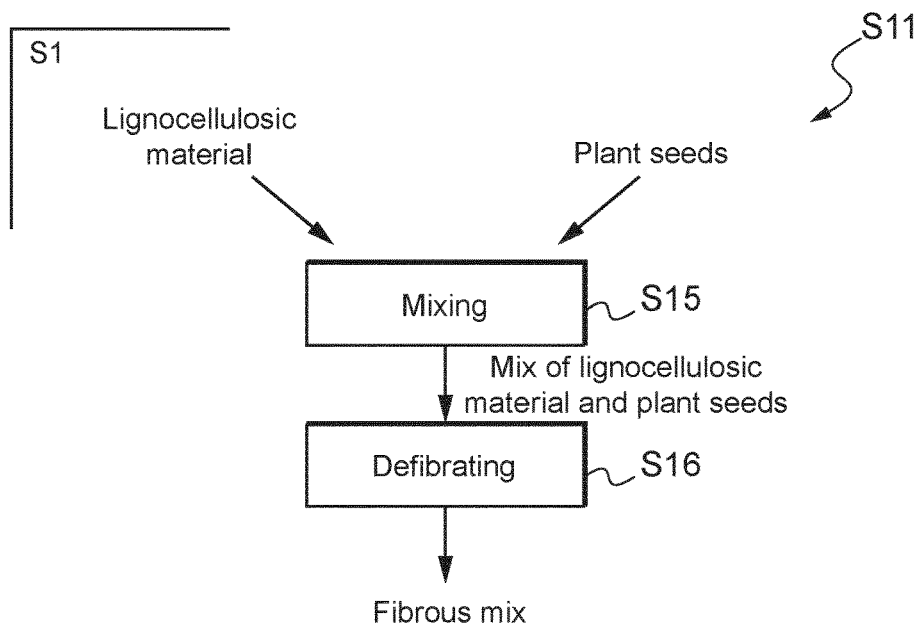
FIG. 3 is a schematic block diagram representing a second example embodiment of one of the steps of FIG. 1.
Figure 4:
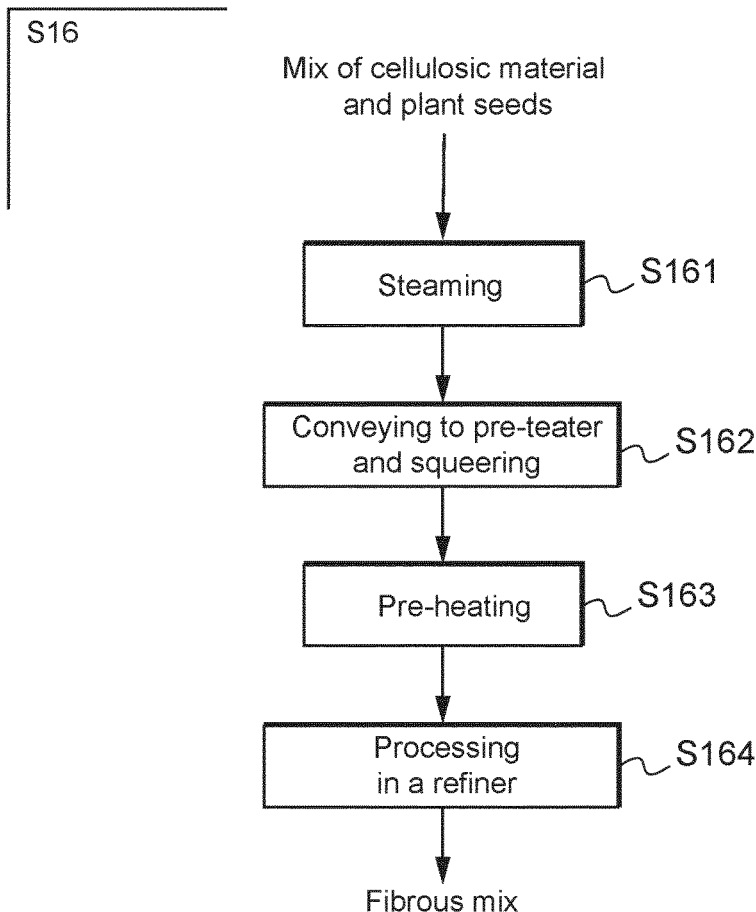
FIG. 4 is a schematic block diagram representing a first example embodiment of one of the steps of FIG. 3.
Figure 5:
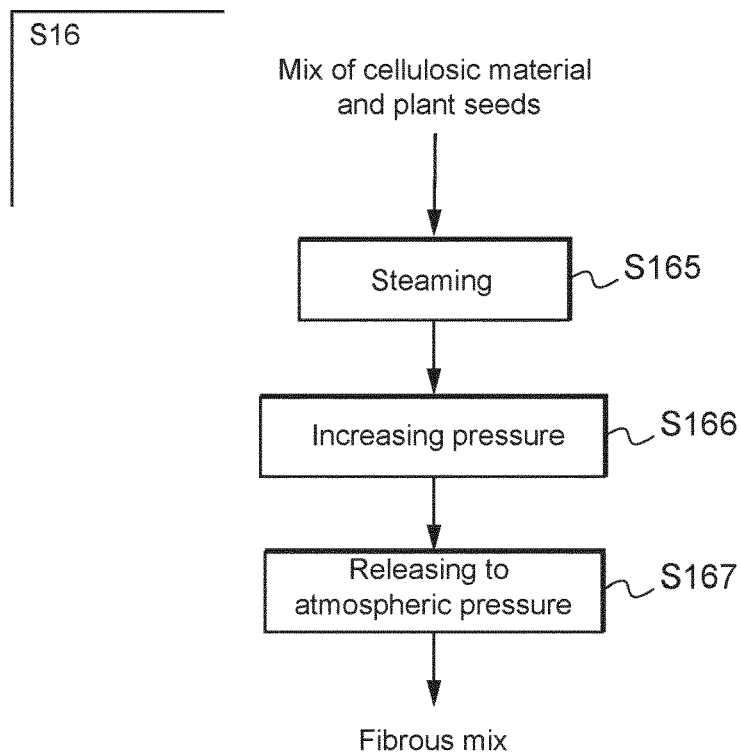
FIG. 5 is a schematic block diagram representing a second example embodiment of one of the steps of FIG. 3.

Defibration may be performed according to several processes, which are exemplified in FIGS. 4 and 5 hereafter described. There are two main ways to perform the step of obtaining a fibrous mix S1, which are described respectively with reference to FIG. 2 and FIG. 3.

The fibrous mix comprises a ratio of lignocellulosic material to plant seeds comprised between 50:50 and 99:1, and preferably between 80:20 and 95:5.

A step of blending the obtained fibrous mix with resin S2 is then performed. This step may be performed in a blow line, where the fibrous mix is sprayed with a resin, preferably a thermoset resin. After this step, a composite mixture is obtained. The amount of resin sprayed may advantageously be such that the resin (i.e. the dry matter of the resin)

represents from 0.1% to 20%, preferably from 0.3% to 5%, more preferably 0.5% to 3%, in weight of the total dry matter of the composite mixture. In addition to the fibrous mix and the resin, the composite mixture may comprise an amine compound, and/or additives. The amine compound is preferably one of urea, methylurea, polyurea, polyvinylamine, melamine, polyethylenimine (PEI), diethanoldiamine, ethanoldiamine, ethanolamine, diethanolamine. The additive(s) is at least one of: a wax, a metal salt, a vegetable oil, a fatty acid, a silicone.

The amine compound may be added either to the fibrous mix before it is resinated, or to the resin before it is blended with the fibrous mix. Preferably, the amine compound is added to the resin before it is blended with the fibrous mix. The amount of added amine compound may be such that the amine compound represents from 0% to 25%, preferably from 0% to 10%, and more preferably from 2% to 10% in weight of the total dry matter of the composite mixture (i.e. of the fibrous mix, resin, amine compound(s) and additive(s)).

The additive (or additives) may be added either to the fibrous mix before it is resinated, or to the resin before it is blended with the fibrous mix. Preferably, the additive (or additives) is added to the fibrous mix before the resinating step. The amount of additives may be such that the additives represent from 0% to 20%, preferably from 0% to 10%, and more preferably from 0.1% to 3% in weight of the total dry matter of the composite mixture (i.e. of the fibrous mix, resin, amine compound(s) and additive(s)).

In a subsequent curing step S3, the composite mixture obtained after blending the fibrous mix with resin is cured. In this step the curing agent (i.e. essentially the resin) is hardened by cross-liking of polymer chains. The result of this step is a composite material, which may be further processed to form a final product such as a fibreboard. An example embodiment of the curing steps S3, comprising several steps and optional steps to provide a fibreboard, is detailed with reference to FIG. 6.

Figure 2:
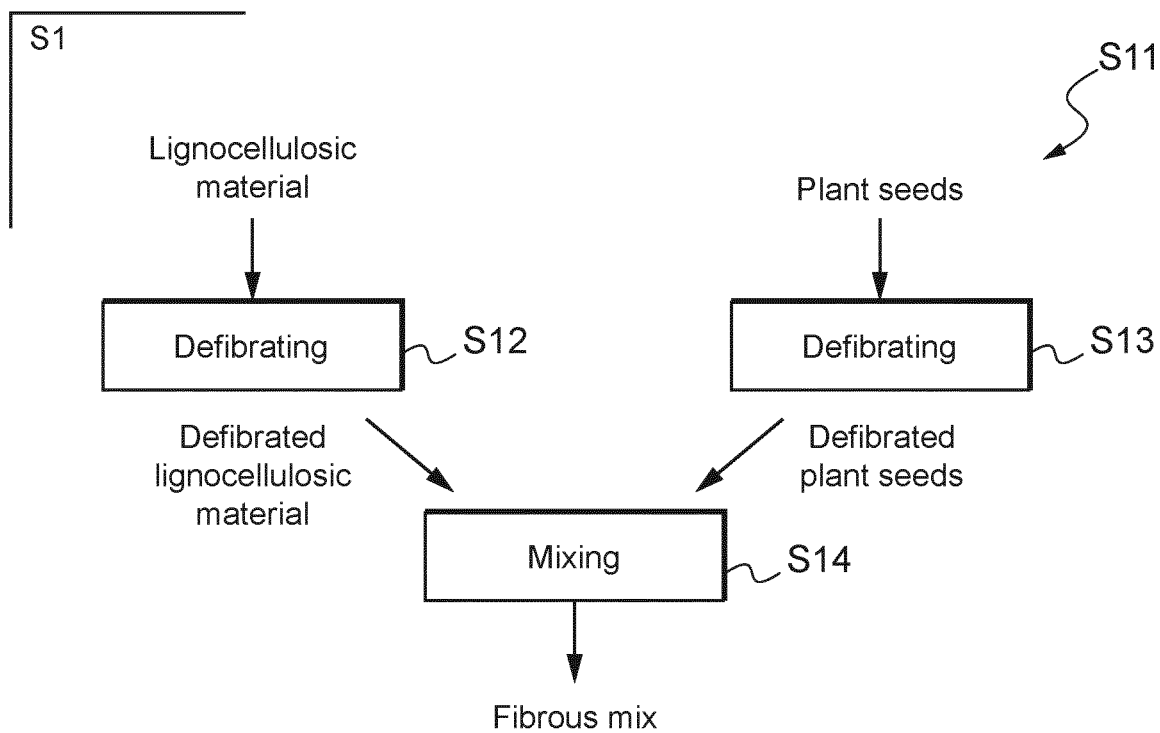
FIG. 2 is a schematic block diagram representing a first example embodiment of one of the steps of FIG. 1.

FIG. 2 is a schematic block diagram representing a first example embodiment of the steps of obtaining a fibrous mix S1 comprising a defibrated lignocellulosic material and defibrated plant seeds. A lignocellulosic material (e.g. wood chips) and plant seeds (e.g. oil and protein seeds such as sunflower seeds meal pellets) are provided (S11). According to this first embodiment, the lignocellulosic material is defibrated (step of defibrating the lignocellulosic material S12). In parallel, the plant seeds are defibrated (step of defibrating the plant seeds S13).

The step of defibrating the lignocellulosic material S12 and the step of defibrating the plant seeds S13 are performed independently. They may be performed on a same production site, or in different, independent, production sites. The defibrated lignocellulosic material and the defibrated plant seeds are mixed (step of mixing S14) to form a homogeneous fibrous mix having the desired ratio of lignocellulosic material to plant seeds.

FIG. 3 is a schematic block diagram representing a second example embodiment of the step of obtaining a fibrous mix S1 comprising a defibrated lignocellulosic material and defibrated plant seeds.

A lignocellulosic material (e.g. wood chips) and plant seeds (e.g. oil and protein seeds such as sunflower seed meal pellets) are provided (S11). According to this second embodiment the lignocellulosic material and the plant seeds are mixed (mixing step S15) to form a so-called mix of lignocellulosic material and plant seeds. A step of defibrating the mix of lignocellulosic material and plant seeds S16 is performed. In this steps, the lignocellulosic material and the plant seeds are defibrated together, thereby forming a homogeneous fibrous mix.

Whether the lignocellulosic material and the plant seeds are defibrated together according to the method of FIG. 3 or separately according to the method of FIG. 2, defibration can be performed according to two alternative types of process, respectively called Asplund method and Mason method.

FIG. 4 represents an example embodiment of the step of defibrating the mix of lignocellulosic material and plant seeds S16 according to an Asplund method.

The method of FIG. 4 comprises a step of steaming S161 the mix of lignocellulosic material and plant seeds in a steaming bin by steam being to a temperature comprised between 70° C. and 110° C., and preferably comprised between 80° C. and 95° C. In subsequent step of conveying and squeezing S162, the steam-heated mix is conveyed to a pre-heater. Water is squeezed out of the mix of lignocellulosic material and plant seeds, before the mix enters the pre-heater.

In the preheater, the squeezed mix of lignocellulosic material and plant seeds is pre-heated (S163). The pre-heating temperature depends on the mix that is pre-heated, and essentially on the lignocellulosic material of the mix. More particularly, the pre-heating temperature must be adapted to soften the lignocellulosic material fibres to ease their upcoming defibration.

Then a step of processing the mix in a refiner S164 also called refining is performed.

The refiner comprises a one or several discs and plates which are mounted on each of the opposing faces of the refiner disc(s). The plates and/or the disc(s) are rotary. The pre-heated mix is provided near the center of the plates and disks, and subjected to a centrifugal force that propels it outwards, so that it moves between the opposing refiner plates in a generally radial direction from the inner perimeter to the outer perimeter of the plates and disc(s).

The refiner plates generally feature a pattern of bars and grooves, as well as dams, which together provide a repeated compression and shear actions on the introduced material (i.e. the mix). The compression and shear actions acting on the material intend to separate fibres from the material, provides a certain amount of development of fibrillation of the material, and generates some fibre cutting which is usually less desirable.

The refiners can be high, medium or low consistency refiners. The refiner discs may operate at rotational speeds of 900 to 2300 revolutions per minute (RPM) when used for high consistency refining and as low as 400 revolutions per minute for low consistency refining.

After the defibrating step, a fibrous mix is obtained and can be further processed.

FIG. 5 represents an example embodiment of the step of defibrating the mix of lignocellulosic material and plant seeds S16 according to a Mason method.

The method of FIG. 5 comprises placing the mix of lignocellulosic material into a chamber. The chamber generally designates a closed volume able to sustain a high pressure. A step of steaming S165 is performed, wherein the mix of lignocellulosic material and plant seeds is saturated with steam. The pressure inside the chamber is increased for this step to a pressure comprised between 200 and 1000 kPa, such as between 400 and 900 kPa, for example a pressure of about 690 kPa (which roughly corresponds to 100 pounds per square-inch).

A step of increasing the pressure S166 is performed, wherein the pressure inside the chamber is increased to a pressure comprised between 2000 and 4000 kPa, such as between 2500 and 3500 kPa, for example a pressure of about 2800 kPa (which roughly corresponds to 400 pounds per square-inch).

The mix contained in the chamber is defibrated by a sudden release from the chamber to atmospheric pressure, through an orifice of the chamber which suddenly opens (step of releasing to atmospheric pressure S167).

After this step, a fibrous mix is obtained and can be further processed.

Figure 6:
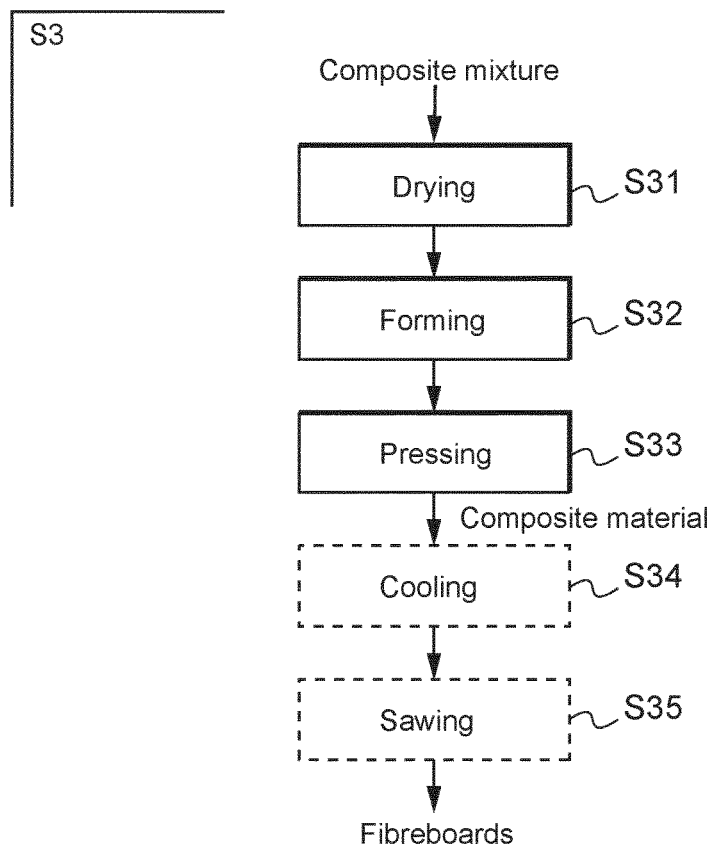
FIG. 6 is a schematic block diagram representing an example embodiment of one of the steps of FIG. 1.

FIG. 6 is a schematic block diagram representing an example embodiment of the curing step S3 of FIG. 1. The curing step S3 designates the succession of operations or steps performed after the resinating step S2 up to obtaining a cured composite material.

An example embodiment of the curing step is briefly described with reference to FIG. 6, but the resinated fibrous mix obtained after the resinating step S2 may be processed according to any adequate subsequent sequence of steps known in the prior art.

The curing step S3 represented in FIG. 6 comprises a drying step S31, wherein the resinated fibrous mix is dried to a moisture content comprised between 0% and 20%, and preferably between 5% and 10%. Dryer cyclones and a Z-Sifter may be used to perform the drying step. A Z-Sifter cleans the fibres of contaminates before the next step. The dried resinated fibrous mix is then formed into a composite mat (forming step S32). The mat undergoes a pressing step (S33), which may comprise passing the mat through successive presses, such as a cold pre-press and then a hot press. After pressing, the composite material is hardened to its final state.

In optional steps, the composite material is handled and machined to form fibreboards. These steps comprise cooling S34 and sawing S35 the lignocellulosic fibre-based composite material, thereby forming fibreboards.

The described process can for example be used to form high density fibreboard panel (having a density greater than 800 kg/m$^3$), medium density fibreboard or MDF (having a density comprised between 650 kg/m$^3$ and 800 kg/m$^3$), low density fibreboard (having a density comprised between 550 kg/m$^3$ and 650 kg/m$^3$) and ultra-low density fibreboard (having a density of less than 550 kg/m$^3$).

Examples

In the hereafter described examples, sunflower meal pellets were used, which are a by-product obtained after pressure and solvent (hexane) extraction of oil from sunflower seeds. The sunflower meal pellets used in the examples below were supplied by Saipol France and used as received.

The sunflower meal pellets comprise about 38.8% wt proteins, have a moisture content of 11% and have a size of about 5×15-30 mm.

Wood chips used in the examples described below are made from pine from South-east Germany.

UF resin used as reference was Kaurit 340S with 66% wt solid, purchased from BASF.

The polyamidoamine-epichlorohydrin (PAE CA 1920) resin was purchased from Solenis (Wilmington, Delaware) and used as received. The PAE CA1920 resin is an aqueous solution with a polymer solids content of 20% wt.

The water repellent used was a wax in emulsion hydro-wax 138 with a solid content of 60% wt purchased from Sasol.

Ammonium sulphate with solid content of 35% wt was used as catalyst for UF resin.

Technical grade granules of urea containing 46% wt nitrogen were supplied by Yara and used as received.

Board (Medium-Density Fibreboard) Preparation, According to Example Embodiments of the Present Invention, with Pellets and PAE Resin Sunflower meal in pellets form was first mixed with wood chips, thus forming a mix of lignocellulosic material and plant seeds.

Different contents of sunflower pellets (in the mix of lignocellulosic material and plant seeds) were tested from 0 (no mix is formed) to 28% w/w. The amount of pellets was calculated based on oven dry wood (i.e. based on the solid material present in the wood).

The mix lignocellulosic material and plant seeds was steamed in a steaming bin to a temperature of 80° C. to 95° C.

The steamed mix of lignocellulosic material and plant seeds was transported to the pre-heater (Andritz) via an integrated conveyor. A continuously operating plug screw with integrated drainage (MSD-Multi Screw Device) for squeezing water out of the mix of the steamed lignocellulosic material and plant seeds conveyed the material to the pre-heater.

The material was fed into the pre-heater (or cooker) using an Andritz apparatus, at 9 bar pressure with constant throughput which led to a retention time in the pre-heater of 3 to 4 min. After plasticization (at a temperature around 160° C. in the pre-heater which makes the fibres soft and easier to separate) the material was continuously fed through a discharge screw into the refiner in which it was processed, i.e. defibrated according to a thermo-mechanical process (i.e. an Asplund type process).

An emulsion of wax was applied through the feed screw of the refiner.

From the refiner, the mix of defibrated lignocellulosic material and defibrated plant seeds was discharged via the tangential outlet into the blowline where the PAE resin was injected separately. At the exit of the blow line, there is thus formed a mixture comprising the mix of defibrated lignocellulosic material and defibrated plant seeds and the resin.

The amount of PAE resin was calculated to have several given percentages, in weight, of solid from the resin, based on oven-dry wood.

For boards prepared using urea, a solution of urea in water (40% w/w) was mixed with PAE resin. Urea was calculated to have 7% in weight of solid from the urea solution and PAE was calculated to have 0.9% in weight of solid from the resin, based on oven-dry wood. The mix of urea and PAE was injected through a blowline and pellets (6% in weight, based on dry wood), were premixed with the wood chips.

After processing in the blow line, the resinated wood was flash-dried at 100° C., using a Schenkmann & Piel apparatus. The moisture content of the resinated fibres after the flash-drying step varied between 6.3% and 7.8%. The fibres were then transported to the mat building process.

After this process each mat (having thicknesses comprised between 390 and 450 mm) were prepressed in a separate single daylight press at room temperature with a pressure of 1 N/mm$^2$ for 60 s.

Afterwards each mat was pressed in a single daylight hot press with a target density of 740 kg/m$^3$ and a target thickness of 11.5 mm. The boards were pressed on a HÖFER hot press. The press temperature was 210° C. and the press time factor was of 10 s/mm.

Board Preparation with Wood and Liquid Resins (Comparative Example)

A process identical to the above described process was performed on wood chips (instead of on a mix of lignocellulosic material and plant seeds), up to the discharge of a defibrated material (i.e. defibrated wood instead of a mix of defibrated lignocellulosic material and defibrated plant seeds) from the refiner to the blow line.

A dispersion of micronized solvent extracted sunflower meal (D10=6 µm; D50=37 µm; D90=138 µm) blended with PAE resin was prepared. The micronized meal was first dispersed into water with a solid content of 17% in weight based on total dispersion weight (this solid content was determined to achieve an adhesive with low viscosity of about 200 mPa·s). PAE resin was added. PAE was calculated to keep a meal/PAE weight ratio of 6.9. pH was adjusted to 6.3 with a 5M NaOH solution.

The amount of resin was calculated to have 12% or 15% in weight of solid from the adhesive (i.e. the blend micronized solvent extracted sunflower meal and PAE resin) in the total solid weight of the mixture, based on oven dry wood.

The moisture content of the resinated fibres after the drying step was 7.2%.

For boards prepared using urea, a dispersion of micronized solvent extracted sunflower meal was prepared by mixing with granules of urea until complete solubilisation. The ratio of sunflower meal and urea was 44% w/w and 56% w/w, respectively. After 10 min of mixing, PAE resin was added and calculated to have a final meal/PAE ratio of 6.9. pH was adjusted to 6.2 with a 5M NaOH solution. The new solid content was 29.5% and the amount of resin content was calculated to have 6% w/w of micronized solvent extracted sunflower meal, 7% w/w of urea and 0.9% w/w of PAE resin.

The liquid sunflower-based adhesives were applied as dispersion directly after the refiner outlet into the blow line.

Then, after processing in the blow line, the resinated material was dried and pressed as above explained with reference to the preparation of board according to example embodiments of the present invention.

The same process was performed with UF resin, as reference. The UF resin was first mixed with 2% in weight of ammonium sulfate as catalyst based on dry UF. The UF resin loading was calculated to have 15% in weight of solid from the binder (resin and catalyst) in the total solid weight, based on oven-dry wood.

Board Characterization

European standards were used to measure Modulus of Rupture (MOR), Modulus of Elasticity (MOE) (according to EN 310:1993 standard) Internal Bond strength (IB) (EN 319:1993), and dimensional stability (EN 317:1993). Prior to the tests, the samples were conditioned in a room at 20° C. and 65% relative humidity. All specimens were characterized using an Imal apparatus.

To evaluate the MOE and MOR, four test specimens with nominal dimensions of 400×50×11.5 mm were cut from the MDF panels. The MOE and MOR of MDF boards were determined by a static three-point bending test and the values were calculated and recorded for each specimen. The values were compared to the minimum industry requirements for MOR (25 N/mm$^2$) and MOE (2500 N/mm$^2$) for MDF panels in dry condition for boards with density between 700 to 800 Kg/m$^3$.

To determine the internal bond strength IB and the thickness swell TS, six test specimens with nominal dimensions of 50.0×50.0×11.5 mm were cut from test panels for each condition. The IB was calculated and recorded after each specimen was tested to failure. The TS that is defined as the percentage increase in the thickness of a specimen after immersing in water for 24 hours at room temperature were measured, before and immediately after the 24 hours of immersion. A low TS reflects a high water resistance. The values were compared to the minimum industry requirement for IB (0.6 N/mm$^2$) and to the maximum industry requirement for TS (15%) for MDF boards with density between 700 to 800 Kg/m$^3$.

Results and Discussion

The influence of pellets and PAE resin used in the formulation of the biobased adhesive on MDF board properties was investigated. Different amounts of PAE resin (w/w) were first evaluated keeping the same amount of pellets at 16% in weight of the total solid weight in the composite mixture, based on oven dry wood.

The results are shown below in Table 1.

TABLE 1

Mechanical properties of the MDF manufactured with UF or biobased adhesives based on sunflower meal pellets (16% w/w) and PAE resin according to PAE percentage (w/w)

| Sample identification | Internal bond strength (N/mm$^2$) | Swelling in the thickness (%) |
| --- | --- | --- |
| UF | 0.66 | 22.2 |
| Pellet/PAE 0% | 0.17 | 112.0 |
| Pellet/PAE 1.6% | 0.66 | 18.0 |
| Pellet/PAE 2.4% | 0.85 | 16.0 |

MDF boards prepared with defibrated sunflower meal pellets but without resin exhibited low mechanical performances and poor water resistance.

Injection of PAE resin into a mix of defibrated wood and defibrated seeds (from pellets) leaded to an improvement of both internal bond and swelling properties of the MDF boards. The internal bond strength increased with increasing PAE amount. An internal bond strength above 0.60 N/mm$^2$ was achieved with about 1.5% w/w of PAE or more. It reached a value of 0.66 N/mm$^2$ when 1.6% w/w of PAE was injected, and 0.85 N/mm$^2$ when 2.4% w/w of PAE was injected.

Different amounts of pellets were tested to evaluate the influence of the seeds to PAE ratio.

Table 2 presents a comparison of the adhesion properties of the biobased adhesive containing different amount of pellets, with a fixed amount of PAE resin of 1.6% w/w.

TABLE 2

Mechanical properties of the MDF manufactured with UF or biobased adhesives based on sunflower meal pellets and PAE resin (1.6% w/w) according to pellets percentage (w/w)

| Sample identification | Internal bond strength (N/mm$^2$) | Swelling in the thickness (%) |
| --- | --- | --- |
| UF | 0.66 | 22.2 |
| Pellets 0%/PAE | 0.34 | 29.0 |
| Pellets 4%/PAE | 0.60 | 16.0 |
| Pellets 8%/PAE | 0.64 | 15.0 |
| Pellets 16%/PAE | 0.66 | 18.0 |
| Pellets 20%/PAE | 0.72 | 19.3 |
| Pellets 28%/PAE | 0.89 | 25.7 |

The PAE resin (1.6% w/w) injected into wood particles with no sunflower pellets exhibited low bonding and an unsatisfactory water resistance. When pellets were added to the formulation of boards, both mechanical properties and swelling properties of MDF boards were improved.

Increasing the amount of pellets up to 20% in weight improved the adhesion properties up to 0.72 N/mm². The sample with 8% pellets had good water resistance properties, which slightly decreased with the increase of the pellet amount. Boards prepared with 8 to 20% w/w of pellets and 1.6% w/w of PAE exhibited better mechanical properties and better water resistance compared with boards prepared from UF resin.

In another trial, MDF boards were also prepared from a dispersion of micronized sunflower meal ground into small particles sizes of 6 μm (D10), 30 μm (D50) and 180 μm (D90) and their properties were compared with those obtained for MDF boards obtained with meal pellets (Table 3).

When urea was added into the formulations of sunflower meal blended with PAE, both MOE and MOR increased. The highest MOE and MOR values were obtained when the fibrous mix comprising the defibrated wood and defibrated sunflower meal pellets was blended (resinated) with PAE and urea. In addition, blending PAE and urea allow use of a lower PAE amount of 0.9% w/w instead of 1.6% w/w, while keeping the same bonding strengths and the same thickness swelling properties (water resistance).

Based on these results, it is shown that using a fibrous mix comprising defibrated wood and defibrated meal pellets and a blend of PAE and urea according to the process of the invention is the best formulation to achieve good mechanical properties of fibre boards.

The applicant has conducted another trial, in which MDF boards were prepared as described above with a fibrous mix

TABLE 3

Mechanical properties of the MDF manufactured with biobased adhesives into dispersion or into pellets form (12% w/w) with or without PAE

| Sample identification | Conditions of injection | Internal bond strength (N/mm²) | Swelling in the thickness (%) | Modulus of elasticity (N/mm²) | Modulus of rupture (N/mm²) |
|---|---|---|---|---|---|
| sunflower meal into dispersion | Blowline | 0.40 | 64.5 | 2315 | 15.0 |
| Dispersion of sunflower meal + PAE | Blowline | 0.51 | 27.5 | 2500 | 16.0 |
| Pellets of sunflower meal | Pellets + wood chips into refiner | 0.17 | 112.0 | 2500 | 13.0 |
| Pellets of sunflower meal + PAE | Pellets + wood chips into refiner/ PAE into blowline | 0.50 | 17.0 | 3561 | 26.8 |

Boards prepared from micronized sunflower meal blended with PAE resin exhibited similar internal bond and lower swelling properties (water resistance) than those prepared from a fibrous mix according to the invention.

Measured MOE and MOR of the boards prepared from micronized sunflower meal blended with PAE resin were very low, with values of 2500 and 16 N/mm² respectively.

With pellets (12% w/w) used and mixed with PAE resin (1.6% w/w), the MOE increased to 3561 N/mm² and the MOR increased to 26.8 N/mm².

The boards obtained with a process for the manufacture of a lignocellulosic fibre-based composite material according to the present invention, wherein a fibrous mix of defibrated lignocellulosic material and defibrated plant seeds is formed before resination (without use of a dispersion of protein material mixed with the resin), have better mechanical and water resistance properties than comparable boards made according to prior art processes.

The Influence on board properties of urea blended into the formulation was evaluated (Table 4).

comprising defibrated wood and defibrated sunflower meal pellets except that the fibrous mix was blended (resinated) with a water-based resin comprising 1.6% wt. PAE, 0.2% wt. gallic acid, 2% wt. glycerol, and 1% wt. wax. The obtained fibre boards have good mechanical properties, after pressing at 10 s/mm.

While sunflower seeds are one of preferred plant seeds that may be used in the invention, MDF boards were prepared with seeds from different oil and/or protein plant seeds, and the mechanical performances were compared (Table 5).

TABLE 5

Protein and oil content of the tested plant seeds:

| Seeds | Protein content % w/w on dry matter | Oil content % w/w on dry matter |
|---|---|---|
| Sunflower meal pellets | 38.8 | 1.2 |
| Soy meal pellets | 48.0 | 2.0 |

TABLE 4

Mechanical properties of MDF manufactured with biobased adhesives formulated with PAE with and without urea (properties after pressing at 15 s/mm)

| Sample identification | Internal bond strength (N/mm²) | Swelling in the thickness (%) | Modulus of elasticity (N/mm²) | Modulus of rupture (N/mm²) |
|---|---|---|---|---|
| Dispersion of sunflower meal (11%) + PAE (1.6%) | 0.61 | 23.8 | 2425 | 16.9 |
| Dispersion of sunflower meal (6%) + urea (7%) + PAE (0.9%) | 0.92 | 17.0 | 3050 | 23.0 |
| Pellets (12%) + PAE (1.6%) | 0.74 | 13.0 | 3350 | 26.0 |
| pellets (6%) + urea (7%) + PAE (0.9%) | 0.35 | 17.2 | 3788 | 27.8 |

TABLE 5-continued

Protein and oil content of the tested plant seeds:

| Seeds | Protein content % w/w on dry matter | Oil content % w/w on dry matter |
|---|---|---|
| Canola meal pellets | 38.9 | 4.4 |
| Pea seed | 19.0 | 1.2 |

TABLE 6

Mechanical properties of MDF manufactured with biobased adhesives formulated with PAE (1.6 w/w) based on different proteaginous raw materials (properties after pressing at 10 s/mm)

| Sample identification | Internal bond strength (N/mm$^2$) | Swelling in the thickness (%) |
|---|---|---|
| Sunflower meal pellets/PAE | 0.66 | 18.0 |
| Soy meal pellets/PAE | 0.41 | 23.0 |
| Canola meal pellets/PAE | 0.28 | 26.0 |
| Pea seed/PAE | 0.75 | 39.0 |

Sunflower meal pellets and pea seeds exhibited the best internal bond strengths compared to others plant based proteins.

MDF boards were also prepared from a dispersion of micronized soy flour (meal) ground into small particles sizes of 15 μm (D10), 43 μm (D50) and 115 μm (D90) and their properties were compared with those obtained for MDF boards obtained with a fibrous mix comprising defibrated wood and defibrated soymeal pellets (Table 7).

The soy flour had a protein content of 48% w/w on dry matter and an oil content of 2% w/w on dry matter.

TABLE 7

Mechanical properties of the MDF manufactured with biobased adhesives formulated with PAE (1.6 w/w) and soy flour (12% w/w) into dispersion or into pellets form

| Sample identification | Condition of injection | Internal bond strength (N/mm$^2$) | Swelling in the thickness (%) | Modulus of elasticity (N/mm$^2$) | Modulus of rupture (N/mm$^2$) |
|---|---|---|---|---|---|
| Dispersion of soy flour + PAE | Blowline | 0.41 | 23.0 | 2489 | 18.4 |
| Pellets of soy flour + PAE | Pellets + wood chips into refiner | 0.46 | 21.0 | 2935 | 23.0 |

Boards prepared from micronized soy flour (meal) blended with PAE resin showed similar internal bond properties and comparable swelling properties (water resistance) as those prepared according to the inventions from a fibrous mix comprising defibrated wood and defibrated soy flour (meal). However, the measured MOE and MOR of the boards exhibited higher values when the fibrous mix was used and blended (resinated) with PAE resin. Those results are in accordance with those obtained from sunflower meal pellet, showing that MDF board prepared with a fibrous mix comprising defibrated wood and defibrated sunflower meal pellets and PAE according to the invention has better mechanical properties than comparable boards made according to prior art processes.

MDF boards are prepared from a dispersion of micronized rapeseed meal ground into small particles sizes of 30 μm (D50) and their properties are compared with those obtained for MDF boards obtained with a fibrous mix comprising defibrated wood and defibrated rapeseed meal pellets according to the invention. The rapeseed meal had a protein content of 31% wt, an oil content of 1.5% wt and, a moisture content of 11% wt. Mechanical properties of the MDF manufactured with biobased adhesives formulated with PAE (1.6% w/w) based on rapeseed meal into dispersion or into pellets form (12% w/w) are assessed.

The results are also in accordance with those obtained from sunflower meal pellet and soy flour (meal) pellets above, showing that MDF board prepared according to the invention has better mechanical properties than comparable boards made according to prior art processes using an aqueous dispersion of micronized seed meal and PAE resin.

INDUSTRIAL APPLICATION

The present invention provides a process for the manufacture of a lignocellulosic fibre-based composite material, which has costs and environmental friendliness advantages (in particular as it saves water and energy) over the comparable processes known in the prior art. A preferred application of such a process is the manufacture of fibreboards, such as MDF. Thanks to the manufacturing process according to the invention using defibrated plant seeds as source of protein and fibres, provided in a fibrous mix of defibrated lignocellulosic material and defibrated plant seed, the fibre-based composite material may have enhanced mechanical properties. In some embodiments, these properties may be further enhanced by use of an amine compound and/or of selected additives. The use of a mix of defibrated lignocellulosic material and defibrated plant seeds has not only economic advantages, environmental advantages, advantages in terms of process simplicity, but also advantages with respect to the properties of the final product.

The invention claimed is:

1. A process for the manufacture of a lignocellulosic fiber-based composite material comprising the steps of:
    obtaining a fibrous mix comprising a defibrated lignocellulosic material and defibrated plant seeds, wherein the plant seeds have a protein content ranging from 15% to 60% w/w dry matter;
    blending the fibrous mix with a resin to form a composite mixture; and
    curing the composite mixture, thereby forming the lignocellulosic fiber-based composite material.

2. The process according to claim 1, wherein the step of obtaining a fibrous mix comprises:
    providing a lignocellulosic material and providing plant seeds;
    mixing the lignocellulosic material and the plant seeds, thereby obtaining a mix of lignocellulosic material and plant seeds; and
    defibrating the mix of lignocellulosic material and plant seeds.

3. The process according to claim 2, wherein the step of defibrating the mix of lignocellulosic material and plant seeds comprises a step of steaming the mix of lignocellulosic material and plant seeds before defibration by a thermo-mechanical process or a pressure release based process.

4. The process according to claim 1, wherein the composite mixture comprises:
an amount of defibrated lignocellulosic material ranging from 40% to 99% in weight of the total dry matter of the composite mixture, and
an amount of defibrated seeds ranging from 1% to 60% in weight of the total dry matter of the composite mixture, and an amount of resin ranging from 0.1% to 20% in weight of the total dry matter of the composite mixture.

5. The process according to claim 1, wherein the step of curing the composite mixture comprises the steps of:
drying the resinated fibrous mix to a moisture content comprised between 0% and 20%, forming the dried resinated fibrous mix into a mat, and
pressing the mat to obtain the lignocellulosic fiber-based composite material.

6. The process for the manufacture of a fiberboard, comprising a process according to claim 1, further comprising the steps of cooling and sawing the lignocellulosic fiber-based composite material, thereby forming fiberboards.

7. The process according to claim 1, further comprising a step of adding an amine compound to the resin or the fibrous mix, the added amine compound representing from 0% to 25% in weight of the total dry matter of the composite mixture.

8. The process according to claim 1, further comprising a step of adding an additive to the resin or the fibrous mix, the additive being at least one of: a wax, a metal salt, a vegetable oil, a fatty acid, a silicone, a pH modifier, a polyol, a tannin, a lignin, an amino acid, a metal oxide, starch, a dying agent, a fire retardant agent, the additives representing from 0% to 20% in weight of the total dry matter of the composite mixture.

9. The process according to claim 1, wherein the lignocellulosic material is wood, corn stover, coconut husk, cotton stalk, flax, grass, hemp, kenaf, wheat straw, bagasse, oil palm trunks, bamboo, or a mix of two or more thereof.

10. The process according to claim 1, wherein the plant seeds are provided, before being defibrated, in the form of a seed meal.

11. The process according to claim 1, wherein the fibrous mix comprises at least 40% w/w on dry matter of fibers.

12. The process according to claim 1, wherein the plant seeds are seeds of plants belonging to one or several of the following families: Arecaceae, Asteraceae, Brassicaceae, Cannabaceae, Fabaceae, Linaceae, Malvaceae, and/or Poaceae.

13. The process according to claim 1, wherein the resin is:
a polyamidoamine-epichlorohydrin (PAE) resin, a polyalkylenepolyamine-epichlorohydrin resin, an itaconic acid-based polyamidoamine-epichlorohydrin resin and/or an amine polymer-epichlorohydrin resin,
an epoxy resin such as bisphenol A diglycidyl ether epoxy resin,
isocyanate resin,
urea-formaldehyde resin, melamine-formaldehyde resin, melamine-urea-formaldehyde resin, phenol-formaldehyde resin, resorcinol-formaldehyde resin, other resins based on formaldehyde or on another aldehyde such as furfural, propanal, butyraldehyde, succinaldehyde, glutaraldehyde, dimethoxyethanal, glyoxylic acid, glycolaldehyde, vanillin,
a polyurethane-based resin,
a polyacid-based resin such as based on maleic anhydride or acetic acid,
an acrylate-based or methacrylate-based resin such as poly(methyl methacrylate), or
ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, ethylene vinyl alcohol (EVOH), polyvinylalcohol, polyvinylbutyral-co-vinylalcohol, polyvinylacetate-co-vinylalcohol.

14. A fibrous mix comprising lignocellulosic material fibers and defibrated plant seeds, wherein the weight ratio of lignocellulosic material to plant seeds is comprised between 40:60 and 99:1, and wherein the plant seeds have a protein content ranging from 15% to 60% w/w dry matter.

15. A lignocellulosic fiber-based composite material comprising a fibrous mix according to claim 14 and a resin, the fibrous mix forming a reinforcement and an adhesive for said lignocellulosic fiber-based composite material and the resin, in a cured form, forming or being part of a matrix of said lignocellulosic fiber-based composite material.

16. A fiberboard panel made of a lignocellulosic fiber-based composite material according to claim 15.

17. The process according to claim 7, wherein the amine compound is urea, hexamine, methylurea, polyurea, polyvinylamine, melamine, polyethylenimine (PEI), diethanoldiamine, ethanoldiamine, ethanolamine, or diethanolamine.

18. The process according to claim 1, wherein the lignocellulosic material is wood.

19. The process according to claim 1, wherein the plant seeds are provided, before being defibrated, in the form of seed meal pellets.

* * * * *